(12) United States Patent
Harrison (10) Patent No.: US 9,142,964 B2
(45) Date of Patent: Sep. 22, 2015

(54) ELECTRICAL ENERGY AND DISTRIBUTION SYSTEM

(75) Inventor: Craig William Harrison, Tomago (AU)

(73) Assignee: RENERGYX PTY LIMITED, Tomago, New South Wales (AU)

( * ) Notice: Subject to any disclaimer, the term of this patent is extended or adjusted under 35 U.S.C. 154(b) by 327 days.

(21) Appl. No.: 12/742,421

(22) PCT Filed: Oct. 17, 2008

(86) PCT No.: PCT/AU2008/001542
§ 371 (c)(1),
(2), (4) Date: Jul. 30, 2010

(87) PCT Pub. No.: WO2009/062227
PCT Pub. Date: May 22, 2009

(65) Prior Publication Data
US 2010/0320837 A1    Dec. 23, 2010

(30) Foreign Application Priority Data
Nov. 14, 2007 (AU) ................. 2007906247

(51) Int. Cl.
*H02J 1/00*   (2006.01)
*H02J 3/36*   (2006.01)
(Continued)

(52) U.S. Cl.
CPC ... *H02J 3/36* (2013.01); *H02J 1/00* (2013.01); *H02J 3/381* (2013.01); *H02J 3/382* (2013.01); *H02J 3/383* (2013.01); *H02J 3/386* (2013.01); *H02M 2001/008* (2013.01); *H02M 2001/0074* (2013.01); *H02M 2001/0077* (2013.01);
(Continued)

(58) Field of Classification Search
CPC ........................................ H02J 1/00
USPC ............................... 307/72–78, 36
See application file for complete search history.

(56) References Cited

U.S. PATENT DOCUMENTS 3,558,904 A * 1/1971 Kanngiesser ............ 307/82
4,019,115 A * 4/1977 Lips ....................... 363/65
(Continued)

FOREIGN PATENT DOCUMENTS

DE    197 52 661    6/1999
KR    20010011621   2/2001

OTHER PUBLICATIONS

PCT International Search Report and Written Opinion of the International Searching Authority, Australian Patent Office, Application No. PCT/AU2008/001542, Jan. 20, 2009, 7 pages.

*Primary Examiner* — Adi Amrany (57) ABSTRACT

This invention concerns an electrical energy supply and distribution system. The system is able to handle both large centralized electricity generation plants, as well secondary energy sources which are becoming increasingly important. These sources may or may not be connected to deliver electrical energy to a 50 Hz AC power distribution grid. The system comprises a supply side where multiple electrical energy generators are connected via connections ports, involving conditioning circuitry, into a single DC electrical energy source. This energy source may be supplied to a common inverter system to convert it to AC for transmission on over a power grid. A rectifier may take the AC power from the grid and delivers it to loads. Whether an AC grid in involved or not, on the delivery side energy is delivered to multiple loads via connection ports involving conditioning circuitry. Any of the generators or loads may be taken offline or connected back into the system at will.

13 Claims, 6 Drawing Sheets (51) Int. Cl.
*H02M 1/00* (2007.01)
*H02J 3/38* (2006.01)

(52) U.S. Cl.
CPC .............. *Y02E10/563* (2013.01); *Y02E 10/763* (2013.01); *Y02E 60/60* (2013.01); *Y10T 307/367* (2015.04)

(56) References Cited

U.S. PATENT DOCUMENTS

| | | | | |
|---|---|---|---|---|
| 4,035,659 | A * | 7/1977 | Jeppson | 307/84 |
| 4,057,736 | A * | 11/1977 | Jeppson | 307/78 |
| 4,780,659 | A * | 10/1988 | Bansal et al. | 322/58 |
| 4,791,349 | A | 12/1988 | Minks | |
| 5,355,296 | A * | 10/1994 | Kuo et al. | 363/43 |
| 5,745,670 | A * | 4/1998 | Linde | 714/22 |
| 5,768,117 | A * | 6/1998 | Takahashi et al. | 363/65 |
| 5,962,929 | A * | 10/1999 | Brosh et al. | 307/36 |
| 6,175,217 | B1 * | 1/2001 | Da Ponte et al. | 322/19 |
| 6,184,593 | B1 * | 2/2001 | Jungreis | 307/64 |
| 6,320,274 | B1 | 11/2001 | Goetze et al. | |
| 6,624,533 | B1 * | 9/2003 | Swanson et al. | 307/64 |
| 6,979,771 | B2 * | 12/2005 | Mimura | 136/244 |
| 7,000,395 | B2 * | 2/2006 | Wai et al. | 60/698 |
| 7,087,327 | B2 * | 8/2006 | Pearson | 429/431 |
| 7,244,524 | B2 * | 7/2007 | McCluskey et al. | 429/9 |
| 7,449,798 | B2 * | 11/2008 | Suzuki et al. | 307/65 |
| 7,474,016 | B2 * | 1/2009 | Wang et al. | 307/45 |
| 7,518,266 | B2 * | 4/2009 | Eckroad | 307/82 |
| 7,851,943 | B2 * | 12/2010 | Datta et al. | 307/38 |
| 7,864,497 | B2 * | 1/2011 | Quardt et al. | 361/92 |
| 7,900,361 | B2 * | 3/2011 | Adest et al. | 30/80 |
| 8,004,117 | B2 * | 8/2011 | Adest et al. | 307/80 |
| 8,106,533 | B1 * | 1/2012 | Johnson | 307/66 |
| 8,138,624 | B2 * | 3/2012 | Yeh | 307/10.1 |
| 2004/0155603 | A1 * | 8/2004 | Clegg | 315/291 |
| 2004/0174147 | A1 | 9/2004 | Vinciarelli | |
| 2006/0055175 | A1 * | 3/2006 | Grinblat | 290/54 |
| 2006/0237058 | A1 * | 10/2006 | McClintock et al. | 136/244 |
| 2007/0257558 | A1 | 11/2007 | Berenger | |
| 2008/0284249 | A1 * | 11/2008 | Datta et al. | 307/36 |
| 2008/0315586 | A1 * | 12/2008 | Marvin | 290/44 |

\* cited by examiner

Prior Art

FIG. 3

Prior Art

ELECTRICAL ENERGY AND DISTRIBUTION SYSTEM

TECHNICAL FIELD

This invention concerns an electrical energy supply and distribution system.

BACKGROUND ART

Industrialised countries are heavily dependent on large centralised electricity generation plants to produce power. For example, 80% of the electricity generated in Australia is produced by coal power plants. These power plants are usually built away from the cities where the power is consumed.

In addition, secondary energy sources are becoming increasingly important. Common renewable energy sources include photovoltaic (PV) solar cells, wind turbine generators, wave turbine generators and tidal turbine generators. These sources can be connected to deliver electrical energy to the standard 50 Hz AC power distribution grid by means of AC inverter schemes designed to synchronize with the power grid.

Because the secondary sources deliver fluctuating amounts of energy, connection to the power grid invariably requires some energy storage, with an energy delivery time frame in the order of hours or days. Examples of storage systems include: high capacity batteries (electrical "flow batteries"), solar "molten salt", solar hot water, and solar generated biogas where electrical energy is generated in a secondary process such as steam turbine generators. These schemes are relatively expensive and are only economically viable on large scale electrical power systems.

SUMMARY OF THE INVENTION

The invention is an electrical energy supply and distribution system, comprising:
A direct current (DC) loop, having for supplying energy, plural connection ports for selective connection to respective electrical energy generators.
Wherein each connection port includes a bypass to allow direct current to flow round the loop in the absence of a generator connected at that port. And, Electricity conditioning circuitry to deliver and vary direct current power supply to the loop from a connected generator.
And,
For delivering energy, plural connection ports for selective connection to respective electrical energy loads.
Wherein each connection port includes a bypass to allow direct current to flow round the loop in the absence of a load connected at that port. And, Electricity conditioning circuitry to deliver and vary electrical power supply to a load connected at the port.

By connecting multiple electrical generators in a series DC loop, the invention is capable of delivering high voltage DC. The use of high voltage reduces transmission loss due to the corresponding low current. Also the absence of reactive (inductance as well as capacitance) effects associated with AC power distribution systems improves the balance of the delivered power.

The total generated voltage in the DC loop provides a single electrical energy source for storage, and seamless distribution to generators of different types and characteristics.

The loop may include all the energy sources collected together on a "supply side", and all the inverters and loads separately collected together on a "delivery side". Or, the sources and loads may be interspersed in any order around the loop.

The electricity conditioning circuitry on the supply side may involve a switching regulator in boost mode. Other switching regulators such as a flyback regulator, a buck regulator and a bridge regulator may be used. The electricity conditioning circuitry allows variation in the DC loop voltage by adjustment and synchronisation of the supply side connection ports.

A flyback regulator or bridge inverter may be used in conjunction with a galvanic isolation transformer. Such a configuration provides isolation of electrical energy generators (and loads) for safety or equipment isolation purposes.

The electrical generators may be AC or DC electrical generators. An electrical generator may be a wind turbine, photovoltaic solar cells, a diesel power generator, a motor generator, a gas turbine, a steam turbine, a tidal turbine, a storage battery or a reticulated supply.

An AC electrical generator may be connected to the direct current loop via a rectifier bridge that converts the AC power to DC. The rectifier bridge may also function as a bypass to allow direct current to flow round the loop if the generator is not available. Galvanic isolation may also be provided by the addition of a transformer between the AC generator and the rectifier In addition the electrical generator may be an asynchronous induction type generator arranged with a reactive magnetising power (VAR) generator as described in our copending Patent Application No.

The bypass associated with a DC electrical generator may be a diode. The diode may be forward biased when the generator is disconnected from the loop and vice versa.

Electrical energy storage devices, such as batteries and super capacitors, may be included in the supply side. For instance they may be connected into the supply side conditioning circuitry.

The energy produced by the multiple electrical energy generators may then be supplied to a local or wide area distribution system.

On the delivery side, an AC load may be connected to the DC loop via electricity conditioning circuitry that involves an inverter that converts DC power to AC. Single and multiple phase AC and DC loads may be connected into the series DC loop. Automatic synchronisation of the delivery side inverters with a reticulated supply may be achieved though the inverter control system.

A DC load may be connected using a switching regulator, which may be configured to boost up or buck down. A "flyback" switching regulator or bridge converter with a galvanic isolation transformer may also be used to isolate a load.

The bypass device on the delivery side may be a transistor, a thyristor or a mechanical switch.

Electrical energy storage devices, such as batteries and super capacitors, may be included in the delivery side. For instance they may be connected into the conditioning circuitry, in particular through the delivery side inverters or regulators.

The system allows electrical generators and loads to be connected and disconnected without disrupting operation of other parts of the system. Flexibility to connect and disconnect generators increases system reliability and availability while enabling easy maintenance and troubleshooting. New generators and loads may also be added easily.

BRIEF DESCRIPTION OF DRAWINGS

An example of the invention will now be described with reference to the accompanying drawings, in which.

BEST MODES OF THE INVENTION

Figure 1:
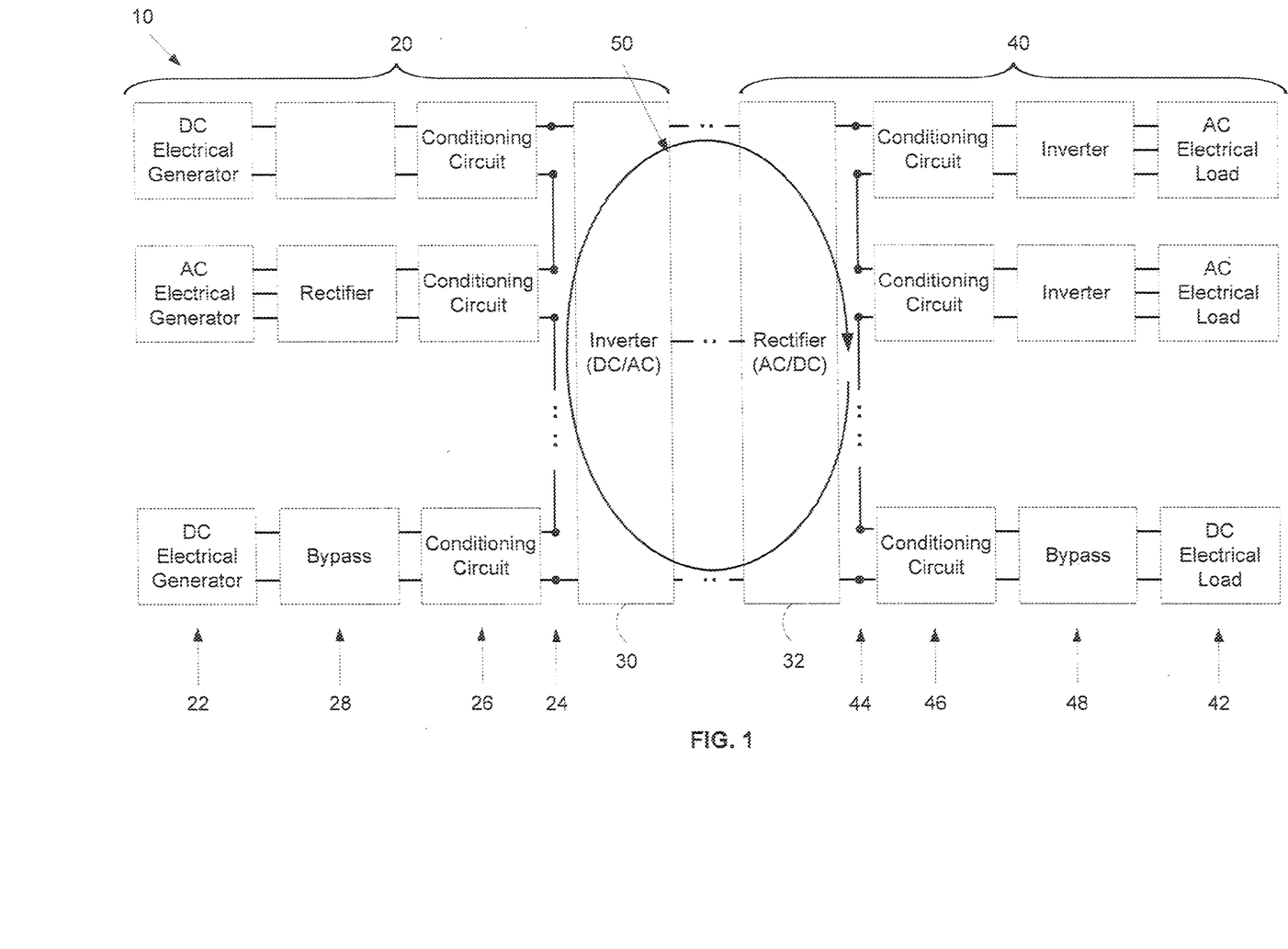
FIG. 1 is a block diagram of an electrical energy supply and distribution system exemplifying the invention.

Referring first to FIG. 1, the electrical system 10 comprises a supply side 20 where, generally, multiple electrical energy generators 22 are connected via connection ports 24, involving conditioning circuits 26 and possibly additional conditioning circuitry 28, into a single DC electrical energy source. This energy source is supplied to a common inverter system 30 to convert it to AC for transmission on over a power grid. A rectifier 32 takes the AC power from the grid and delivers it to AC and DC loads. On the delivery side 40 energy is delivered to multiple loads 42 via connections ports 44 involving conditioning circuits 46 and other conditioning circuitry 48.

In this way the electrical energy generators 22 are connected in a series DC loop 50. Electrical circuit theory dictates that the current in each part of the series DC loop 50 is the same but the voltage developed by each generator is added together. The power delivered is therefore the product of the total voltage and the loop current.

The electrical energy generators 22 include, but are not limited to being: wind turbines; photovoltaic solar cells; storage batteries; ignition engine generator sets; diesel power generator; gas turbines; steam turbines; an asynchronous induction type generator and, a reticulated supply. For example, these energy source may generate powers of up to 100 kWs or MWs and this is understood to be medium scale.

Figure 2:
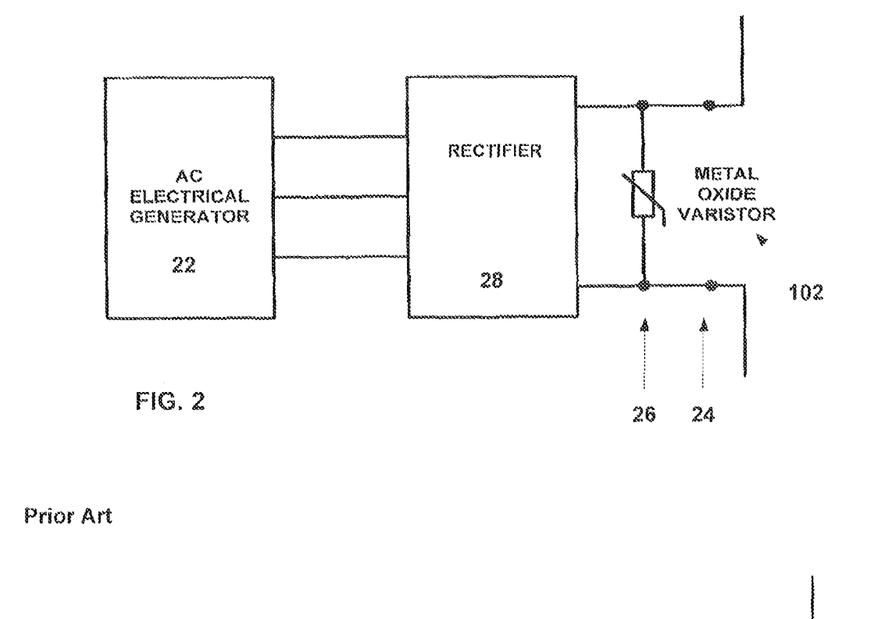
FIG. 2 is a circuit diagram of a typical conditioning circuit.

A typical conditioning circuit 26 will now be described with reference to FIG. 2. In this example an AC electrical generator 22 is connected via rectifier 28 and a conditioning circuit 26 to connection port 24. The conditioning circuit 26 includes an over voltage or "surge suppression" device, being a metal oxide varistor 102. Surge suppression devices are intended to protect the port connection circuits 20 from damage caused by excess voltage. Voltage surges may be caused by lightning strikes or switching high currents. Other examples of over voltage protection devices include high power thryristor "diverter" switches, semiconductor avalanche devices and gas discharge devices.

Figure 3:
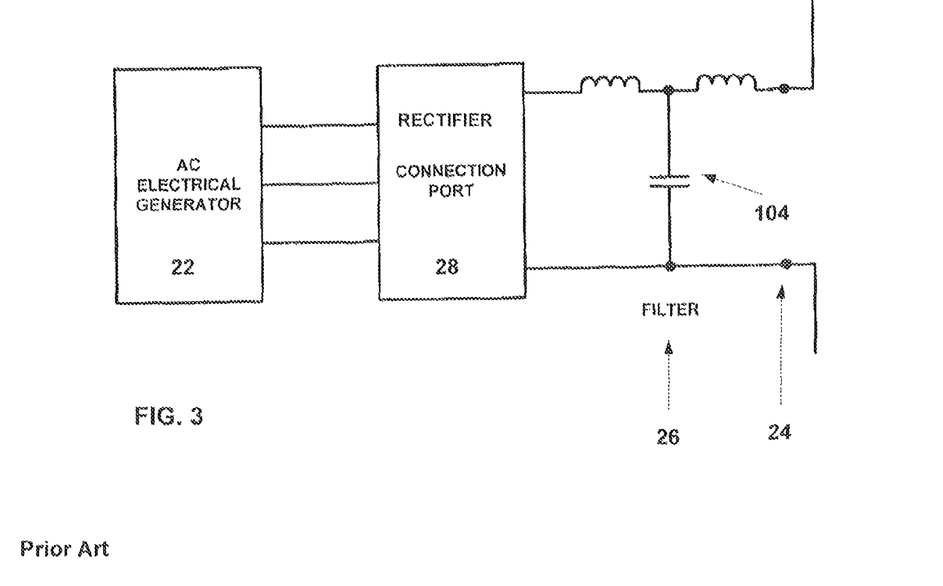
FIG. 3 is a circuit diagram of another typical conditioning circuit.

An alternative conditioning circuit 26 is shown in FIG. 3. In this example an AC 15 electrical generator 22 is connected via rectifier 28 and a conditioning circuit 26 to connection port 24. The conditioning circuit 26 includes a DC power filter 104. DC power filters are comprised of capacitors, inductors or combinations of both, and are applied to limit the rate of change of voltage (dv/dt) across the connection port 24 or rate of change of current (di/dt) in the DC loop 50.

Figure 4:
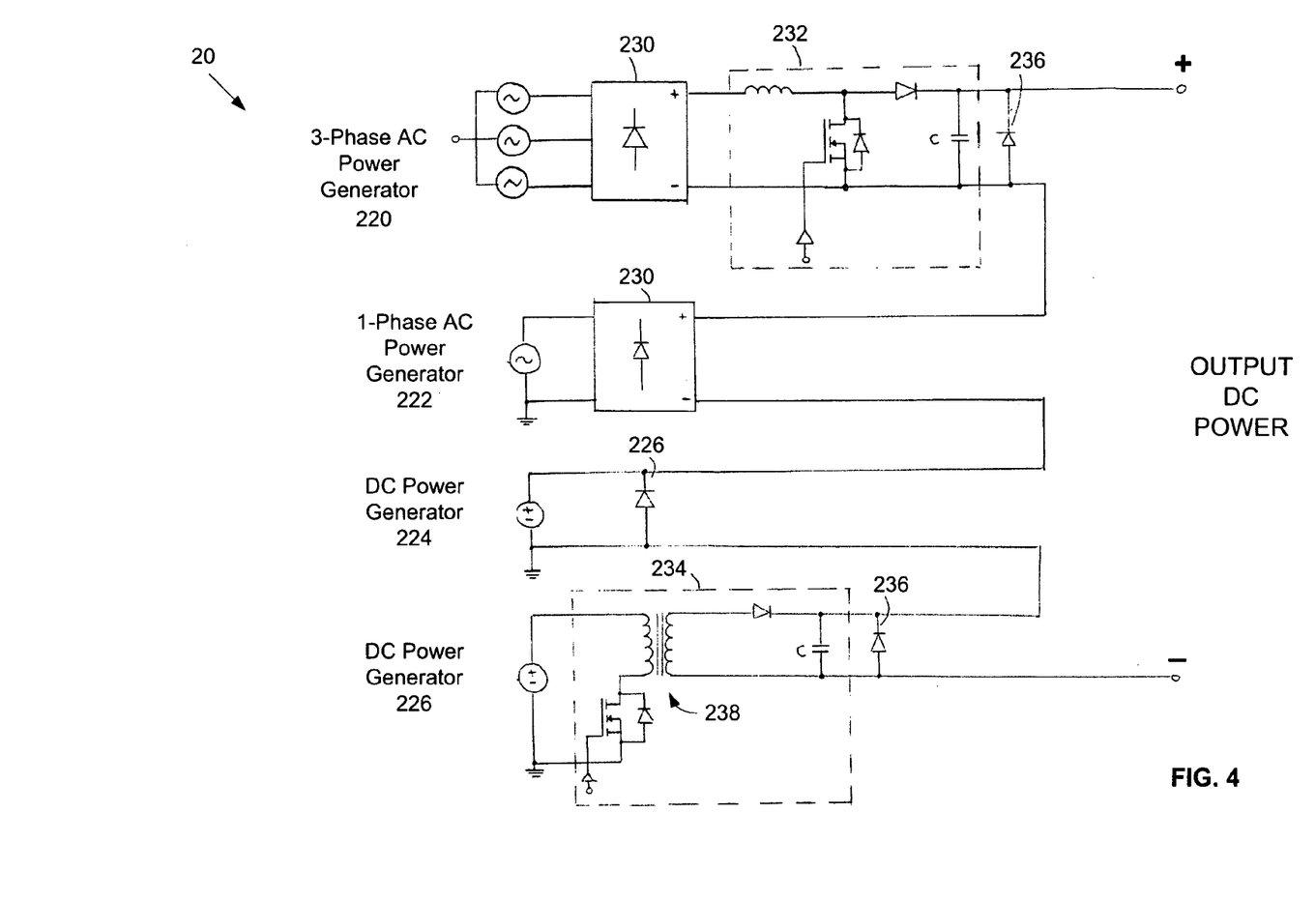
FIG. 4 is a circuit diagram of the supply side of the system.

FIG. 4 shows exemplary circuitry of the supply side 20 (except for the conditioning circuit). A three-phase AC source 220, a single-phase AC source 222 and two DC energy sources 224 and 226 are connected in series to form part of DC loop 50. For example, a DC energy generator may be a solar power panel.

Each AC energy source is first converted to DC using a rectifier bridge 230. The flow of power from the rectifier bridge 230 is controlled using a switching regulator to vary the source output voltage and power. The switching regulator may be either a voltage step up (up converter) or step down (down converter) device.

For example, AC source 220 is connected, via a rectifier bridge 230, to a switching regulator 232 configured in voltage boost mode that takes DC input voltage from the rectifier bridge 230 and produces a higher DC output voltage. The switching regulator shown 232 is a DC switching device where energy is stored in the inductor duty part of the conversion cycle. Alternately the energy is delivered to the filter capacitor C.

Some applications may require galvanic (electrical isolation) of the energy source for safety or electrical equipment isolation purposes. To achieve this, high speed switching regulators may be used in conjunction with a high frequency isolation transformer. As shown in FIG. 4, DC source 226 is connected to a "flyback" switching regulator 234 with a galvanic isolation transformer 238.

Other switching regulators such as buck, buck-boost, push-pull and bridge-type regulators may be used.

The rectifier bridge 230 that is used in conjunction with an AC energy generating source also enables dynamic connection and disconnection of the source without disturbing the continuity of the series loop circuit. When the generator is disconnected or no power is being generated, the current simply commutates through the DC rectifier diodes via the rectifier DC connections.

In the case where the source is a single phase DC source 224, an anti-parallel bypass diode or reverse connected diode 226 provides a path for the loop current when the generated DC generating source is removed or is not generating. Both switching regulators 232, 234 are also shown connected to an anti-parallel bypass diode 236 to provide continuous DC connection.

When a generator is reconnected, the bypass diode is reverse biased by the generated voltage.

The structure of the series connected energy sources provides for the inclusion of electrical energy storage batteries. These batteries may deliver energy to any or all devices in the loop 50.

Figure 5:
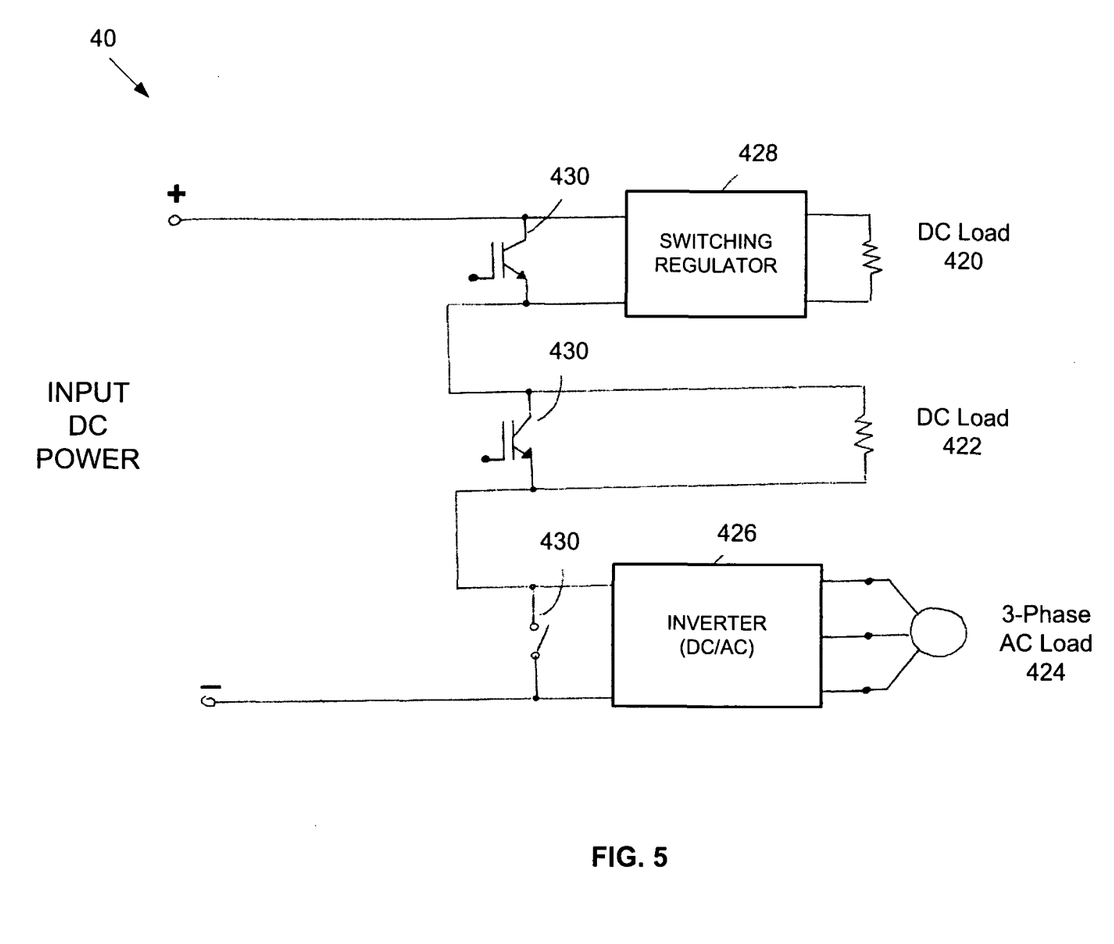
FIG. 5 is a circuit diagram of the delivery side of the system.

On the distribution side 40, various AC and DC loads may be connected into the series DC loop 50. Referring now to FIG. 5, the distribution side 40 comprises two DC loads 420 and 422 and a three-phase AC load 424, all connected in series.

An inverter 426 is required to convert DC to three phase AC to drive the AC load 424.

Input DC voltage delivered to a DC load is regulated using switching regulator 428, which may be configured to boost up or buck down. A "flyback" switching regulator with a galvanic isolation transformer may also be used to isolate a load.

A bypass device or circuit 430 provides for continuous connection of the DC series loop 50 when loads 420, 422 and 424 are connected and disconnected from the loop. Examples of a bypass device include a transistor, a thyristor or a mechanical switch.

Figure 6:
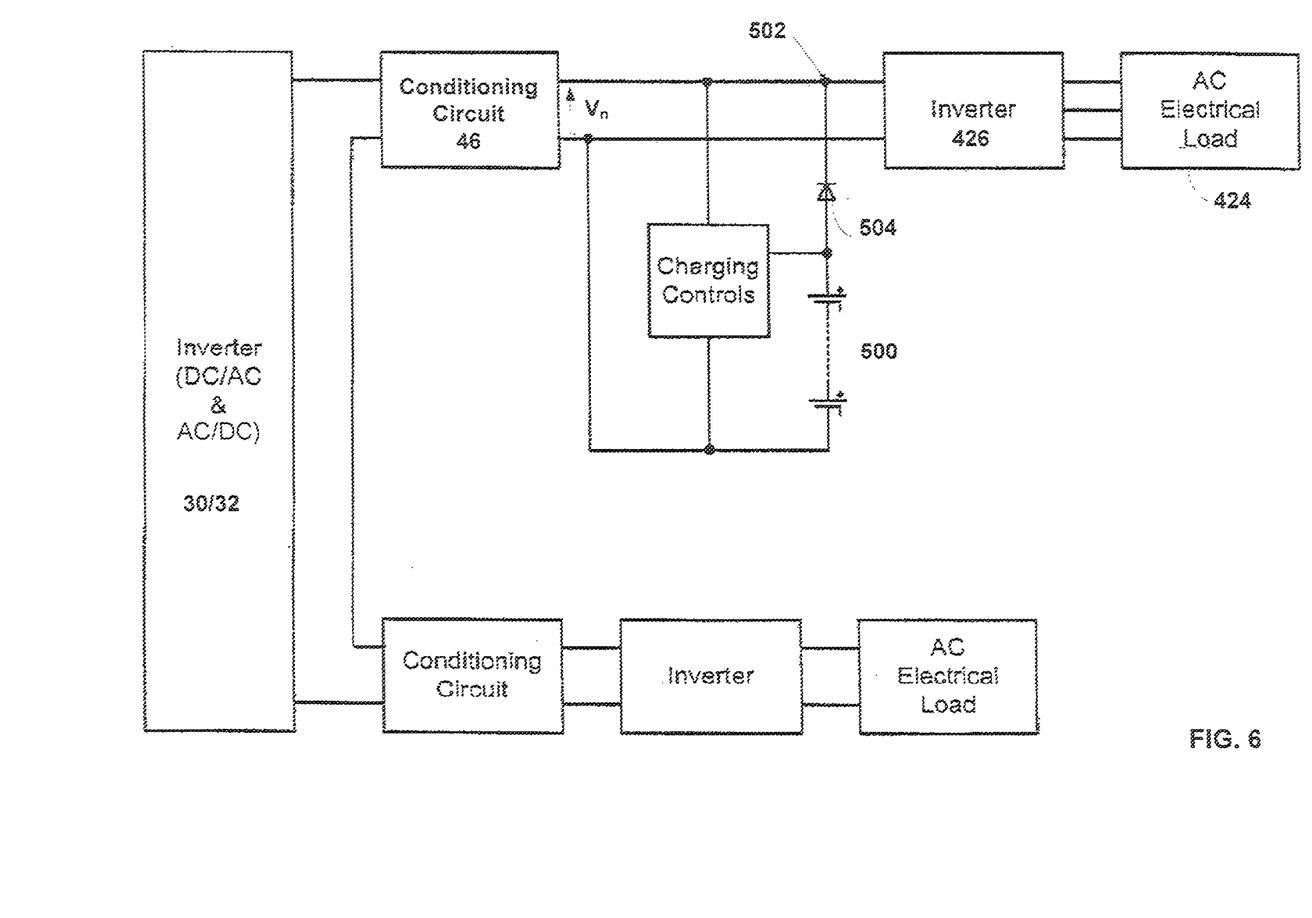
FIG. 6 is a circuit diagram of the delivery side incorporating battery storage.

Batteries may be selectively incorporated into the electrical energy delivery side 40. In its simplest form the battery comprises a series connection of individual cells. The total battery voltage is slightly less than the nominal DC link voltage to ensure that the diode 504 is reverse biased under normal conditions.

The structure of the series connected inverters 426 enables commonly available storage batteries to be selectively incorporated throughout the energy delivery system, as shown in FIG. 6.

A nominal DC link voltage $V_n$ is provided at the output of the conditioning circuit 46.

The battery 500 is connected to the DC link 502 of the inverter 426 through a diode 504 that is arranged to be reverse biased, under normal operating conditions, so that no current flows from the battery.

The battery 500 has charging controls 506 that provide a measured and controlled charging current to maintain the charge in the battery or to recharge the battery after a discharge cycle.

In the event that $V_n$ falls below the battery voltage diode 504 will become forward biased, and the battery 500 will deliver energy to maintain the normal operation of inverter 426. This provides "ride through" voltage support under fault conditions in the order of seconds or minutes.

New batteries are being developed and these are becoming available. These new types offer advantages with increased storage capacity, higher charging and discharging rates, and increased operating life or charge/discharge cycles. Examples include Lithium Polymer and the Altair Nano Lithium cell.

An alternative to batteries is super capacitors, which are becoming more readily available. Super capacitors are high capacitance devices with a low voltage rating. The capacitors are arranged in bank, with series and parallel connections, to provide a suitable voltage rating and aggregate energy storage capacity. Typically individual capacitors are available as 3,000 Farad 2.8 volt units. Capacitor banks comprising 300 capacitors series connected (10 Farad) 750 volt with a discharge cycle between 5 and 30 seconds are suitable for "ride through" support.

One difficulty when using capacitors is that the voltage on the capacitor is proportional to the charge stored in the capacitor. As a result a boost switching regulator is used to increases the voltage at diode to maintain the reverse biased condition under normal operations, and to maintain the DC link voltage as the capacitor charge reduces.

It will be appreciated by persons skilled in the art that numerous variations and modifications may be made to the invention as shown in the specific embodiments without departing from the spirit or scope of the invention as broadly described. For instance, the total DC voltage may be supplied directly as DC power to loads without the intervention of a three-phase AC electrical power grid.

Figure 7:
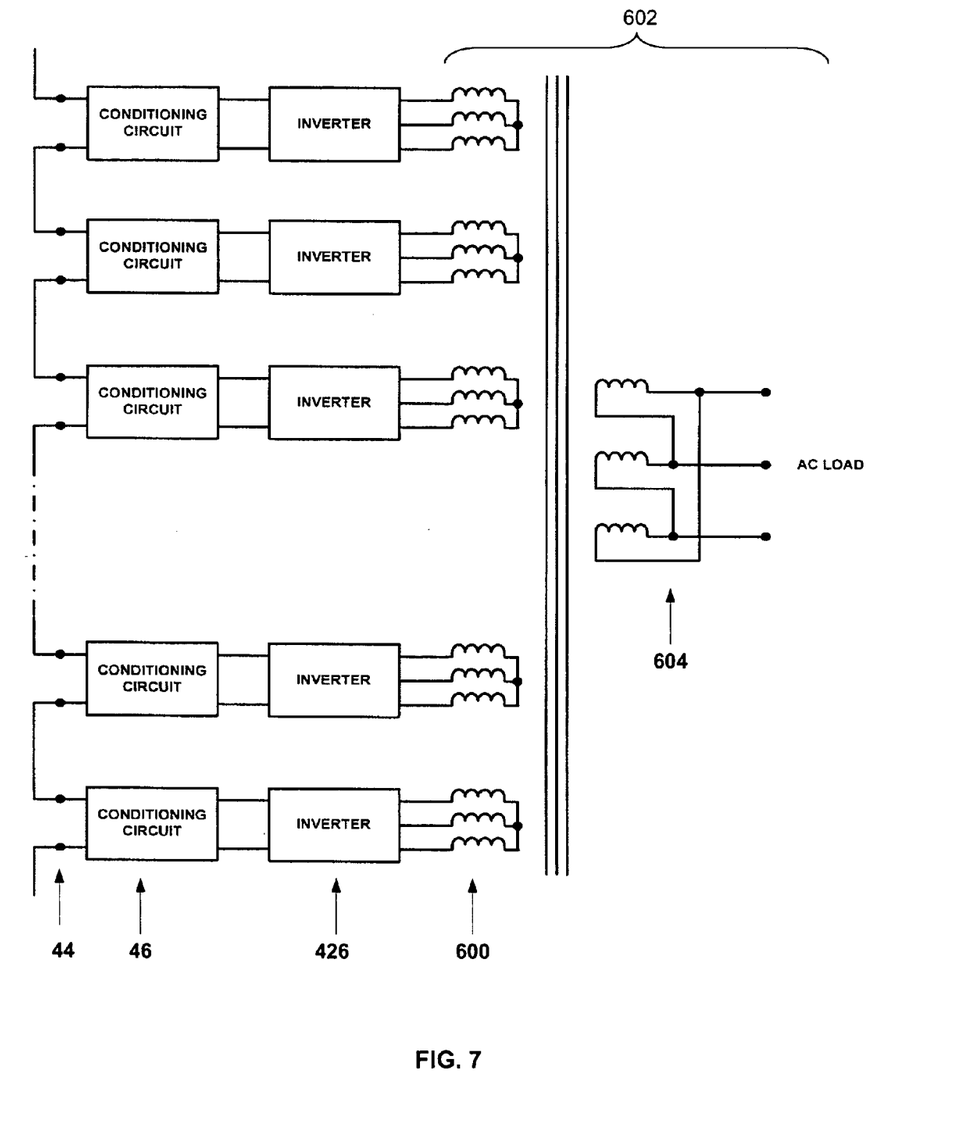
FIG. 7 is a circuit diagram of the delivery side comprising plural parallel inverter outputs connected to individual primary windings of a multi-primary winding transformer.

Also, with reference to FIG. 7, inverters 426 on the energy delivery side 40 may be arranged and connected to deliver aggregated energy to a load such as AC power distribution grid. The aggregation or summation of plural parallel inverter outputs may be achieved by connecting plural individual inverters to individual primary windings 600 on a multi-primary winding transformer 602.

The individual inverters 426 may be synchronised to develop a sinusoidal voltage on transformer secondary or load side winding. The inverter controls modulate the DC link voltage with techniques including pulse width modulation, edge modulation, square wave or multilevel modulation. The inverters may either single phase ("H" bridge), three phase systems or a combination of single and multi-phase inverters. The inverters may be coordinated to operate in voltage summation mode with a common transformer secondary winding 604.

Alternatively, the inverters may be coordinated to operate in a "parallel" or current summation mode by applying multiple transformers with the secondary windings connected in parallel.

The multiple inverter connection enables the inverter outputs to be phase shifted to accommodate various transformer winding connections and vector groups on the primary or secondary side of the transformer. The multiple inverter connection also enables the inverter outputs to be slightly phase shifted to cancel specific harmonic voltages.

The individual inverters conditioning circuit may include a voltage regulator to maintain a constant DC link voltage at the inverter. The voltage regulator may be a boost or buck switching regulator.

The invention claimed is:

1. An electrical energy supply and distribution system suitable for medium scale supply, comprising:
  (i) a supply side for supplying electrical energy, the supply side comprising:
  electrical AC energy generators to generate AC power; and
  a first plurality of connection ports for selective connection to the electrical AC energy generators, each connection port in the first plurality of connection ports including an AC input to receive electrical AC energy from an electrical AC generator of the electrical AC generators, a bipolar DC output to provide DC output power at a DC voltage, a bypass allowing direct current to flow through the connection port when no generator is connected at the AC input of the port, a rectifier bridge to convert the AC power from the generator connected to the AC input of the port to DC power, and a switching regulator connected to the rectifier bridge and to the DC output to control flow of power from the electrical energy generator and to vary DC output voltage and DC output power;
  (ii) a delivery side for delivering electrical energy, the delivery side comprising:
  electrical AC energy loads; and
  a second plurality of connection ports for selective connection to the electrical AC energy loads, each connection port in the second plurality of connection ports including a bipolar DC input to receive DC input power at a DC input voltage, an AC output to provide AC output power to the electrical AC energy loads, a bypass allowing direct current to flow through the DC input of the port when no load is connected at the AC output of the port, a voltage regulator to maintain the DC input voltage constant, a battery or super capacitor connected to an output of the voltage regulator, and an inverter connected to the output of the voltage regulator and to the AC output of the port to generate, and vary the AC output power and deliver the AC output power to the electrical AC energy load connected at the port;
  wherein the DC outputs of the supply side and the DC inputs of the delivery side are connected in series to form a direct current loop.

2. The electrical energy supply and distribution system according to claim 1, wherein all the first plurality of connection ports for selective connection to the electrical AC energy generators are together on the supply side, and all the second plurality of connection ports for selective connection to the electrical AC energy loads are together on the delivery side.

3. The electrical energy supply and distribution system according to claim 1, wherein the first plurality of connection ports for selective connection to the electrical AC energy generators on the supply side and the second plurality of connection ports for selective connection to the electrical AC energy loads on the delivery side are arranged in any order around the direct current loop.

4. The electrical energy supply and distribution system according to claim 1, wherein the supply side further comprises a galvanic isolation transformer connected between the electrical AC energy and the rectifier bridge.

5. The electrical energy supply and distribution system according to claim 1, wherein the electrical generators are one or more of:
   a diesel power generator,
   a motor generator, a gas turbine,
   a tidal turbine generator,
   a steam turbine, or
   a reticulated supply.

6. The electrical energy supply and distribution system according to claim 1, wherein the rectifier bridge also functions as an additional bypass to allow direct current to flow through the DC output of the connection port when the generator is removed from the loop.

7. The electrical energy supply and distribution system according to claim 1, further comprising a transformer connected between the AC generator and the rectifier bridge.

8. The electrical energy supply and distribution system according to claim 1, wherein the electrical generator is an asynchronous induction type generator connected with a reactive magnetizing power (VAR) generator.

9. The electrical energy supply and distribution system according to claim 1, wherein the bypass for the electrical generator is a diode.

10. The electrical energy supply and distribution system according to claim 1, wherein the voltage regulator is a flyback switching regulator.

11. The electrical energy supply and distribution system according to claim 10, further comprising a galvanic isolation transformer to isolate a load.

12. The electrical energy supply and distribution system according to claim 1, wherein the bypass on the delivery side is a transistor, a thyristor or a mechanical switch.

13. The electrical energy supply and distribution system according to claim 1 wherein the inverters of the delivery side comprise plural parallel inverter outputs connected to individual primary windings of a multi-primary winding transformer, synchronization circuitry to develop a sinusoidal voltage on a secondary winding of the transformer, and the secondary winding of the multi primary winding transformer connected to the AC energy load.

* * * * *